United States Patent
Ikegaya

(10) Patent No.: US 6,324,452 B1
(45) Date of Patent: Nov. 27, 2001

(54) VEHICLE STEERING CONTROL SYSTEM

(75) Inventor: Manabu Ikegaya, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/599,607

(22) Filed: Jun. 23, 2000

(30) Foreign Application Priority Data

Jun. 25, 1999 (JP) .................................................. 11-180070

(51) Int. Cl.[7] ....................................................... B62D 5/04
(52) U.S. Cl. ........................... 701/41; 180/422; 180/446; 340/439
(58) Field of Search ................................. 701/41, 42, 43; 180/410, 412, 415, 422, 443, 446; 340/438, 439, 575, 576

(56) References Cited

U.S. PATENT DOCUMENTS 5,642,093 * 6/1997 Kinoshita et al. .................... 340/576
5,765,116 * 6/1998 Wilson-Jones et al. ............... 701/41
6,053,270 * 4/2000 Nishikawa et al. .................... 701/41
6,212,453 * 4/2001 Kawagoe et al. .................... 180/443

FOREIGN PATENT DOCUMENTS 8-249600   9/1996 (JP).
9-91569    4/1997 (JP).
11-78953   3/1999 (JP).

* cited by examiner

Primary Examiner—Gary Chin
(74) Attorney, Agent, or Firm—Arent, Fox, Kintner, Plotkin & Kahn, PLLC

(57) ABSTRACT

A vehicle steering control system for conducting a steering assistance control, in which it is determined whether the vehicle operator has the intention to drive the vehicle by himself. This is done by discriminating the intention using the vehicle lateral deviation, the steering torque and the steering torque change. When it is discriminated that the vehicle operator does not have the intention in two or more discriminations, it is finally determined that the vehicle operator does not have the intention and the vehicle operator is alerted and/or the steering assistance control is discontinued, thereby preventing the vehicle operator from depending on the steer assist torque control excessively.

8 Claims, 11 Drawing Sheets

VEHICLE STEERING CONTROL SYSTEM

BACKGROUND OF THE INVENTION

1. Field of the Invention

This invention relates to a vehicle steering control system.

2. Description of the Related Art

Various technologies have recently been proposed for using a CCD (Charge-Coupled Device) camera or the like mounted on a vehicle, which takes an image of the surface of an expressway or any other road on which the vehicle is traveling and detects white lines (lines painted on the road and defining a lane boundary) from the obtained image and based on this, controlling steering assist torque of the vehicle such that the vehicle runs along the lane.

By providing steering assistance while preventing vehicle lane wandering, these technologies greatly reduce the burden on the vehicle operator. However, since the vehicle operator sometimes tends to depend on this steering assistance control excessively, the assignee proposed, in Japanese Laid-Open Patent Application No. Hei 11 (1999)-78953, detecting the steering torque inputted by the vehicle operator and based on the detected steering torque, determining whether the vehicle operator has the intention to drive the vehicle by himself. Similar techniques have been taught, in Japanese Laid-Open Patent Application Nos. Hei 8 (1996)-249600 and Hei 9 (1997)-91569, in which unusual driving or the degree of awakening of the vehicle operator is detected to determine the vehicle operator's intention to drive the vehicle by himself.

However, the techniques proposed by these prior art references are not always satisfactory in the accuracy of the determination of the intention of the vehicle operator to drive the vehicle and needs to be improved.

SUMMARY OF THE INVENTION

An object of this invention is therefore to provide a vehicle steering control system for conducting the steering assistance control such that the vehicle runs along a lane, which can accurately determine the intention of the vehicle operator to drive the vehicle by himself, thereby preventing the vehicle operator from depending on the steer assist torque control excessively.

In order to achieve this object, there is provided a system for controlling steering of a vehicle having an actuator which turns steered wheels of the vehicle; comprising: an image sensor mounted on the vehicle for taking an image ahead of the vehicle; lane detecting means for detecting a lane on which the vehicle travels based on outputs of the image sensor; and steering assist torque control means for calculating a steering assist torque and conducting a steering assist control to operate the actuator such that the vehicle runs along the lane. The system includes: lateral deviation detecting means for detecting a lateral deviation of the vehicle from a reference line of the lane; and intention determining means for determining whether an operator of the vehicle has an intention to drive the vehicle based on at least the detected lateral deviation; and wherein the steering assist torque control means conducts at least one of alerting the operator and discontinuing the steering assist control, when it is determined by the intention determining means that the operator does not have the intention to drive the vehicle.

BRIEF EXPLANATION OF THE DRAWINGS

This and other objects and advantages of the invention will be more apparent from the following description and drawings, in which.

DETAILED DESCRIPTION OF THE PREFERRED EMBODIMENTS

An embodiment of the invention will now be explained with reference to the attached drawings.

Figure 1:
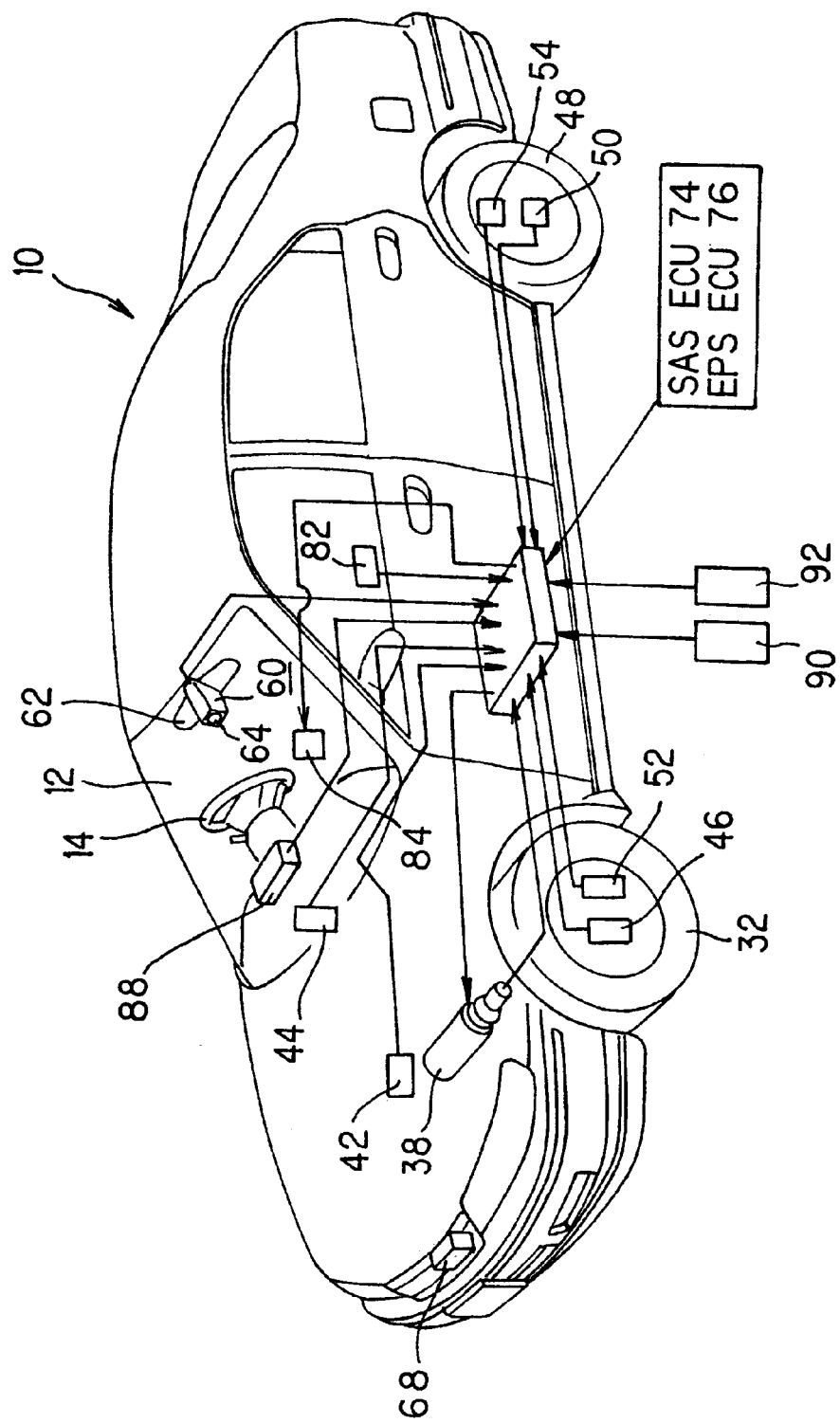
FIG. 1 is a view showing the overall configuration of a vehicle steering control system according to the present invention.
Figure 2:
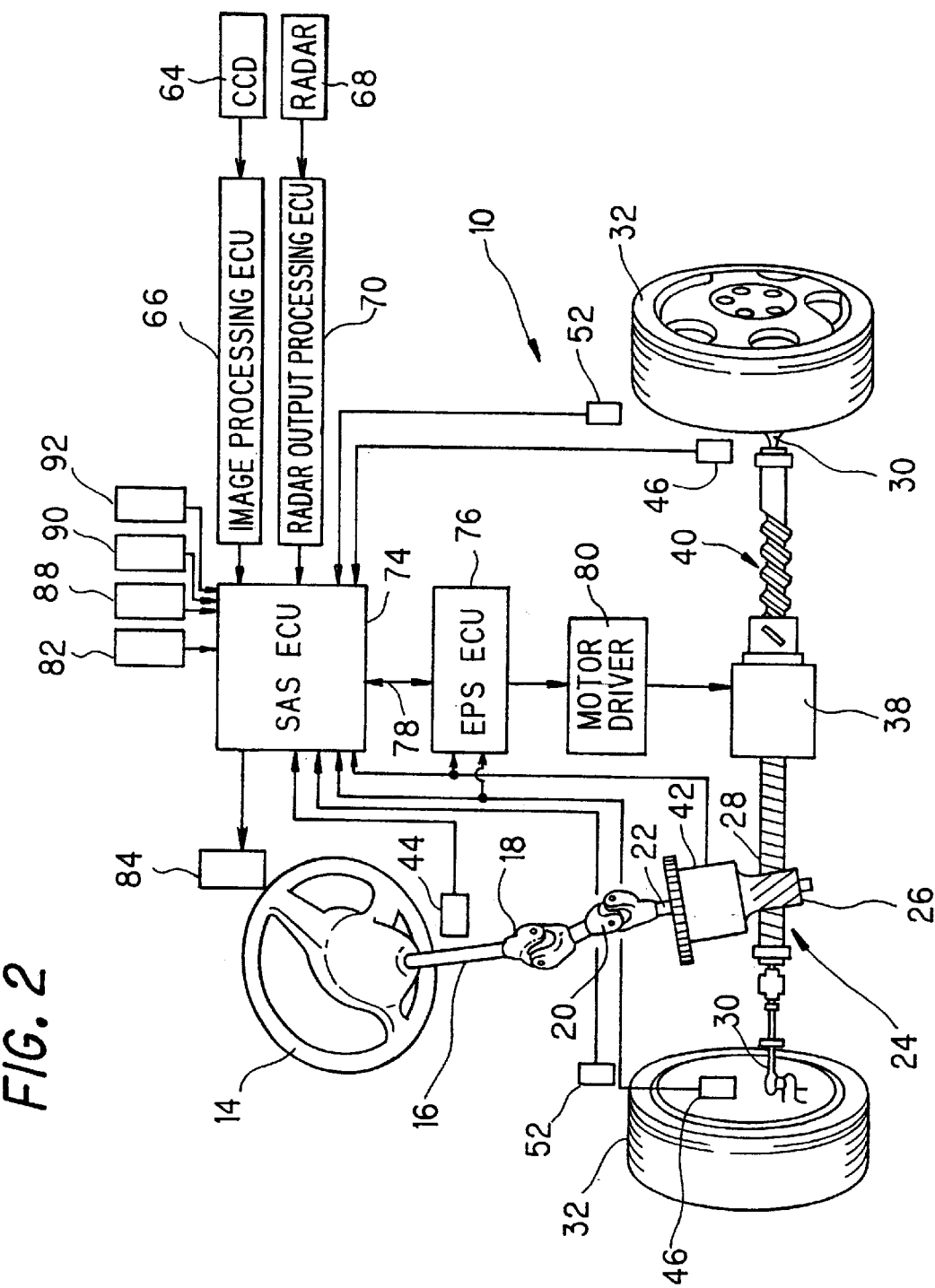
FIG. 2 is an explanatory view showing the configuration of a steering assistance mechanism illustrated in FIG. 1.

FIG. 1 is a view schematically showing a vehicle steering control system according to the present invention. FIG. 2 is an explanatory view of the system with particular focus on the steering assistance mechanism.

As shown in FIGS. 1 and 2, a steering wheel 14 located close to the vehicle operator's seat (not clearly shown in the figure) 12 of a vehicle 10 is connected to a steering shaft 16 that is in turn connected through universal joints 18, 20 to a connecting shaft 22.

The connecting shaft 22 is connected to a pinion 26 of a rack-and-pinion steering gear assembly 24. The pinion 26 is engaged with a rack 28. Rotary motion inputted from the steering wheel 14 by the vehicle operator passes through the pinion 26 to be converted into linear motion of the rack 28. The linear motion passes through tie rods (steering rods) 30, 30 at opposite ends of the front axle to turn two front wheels (steered wheels) 32, 32 in a desired direction around the associated king pins (not shown).

An electric motor 38 and a ball-screw mechanism 40 are disposed coaxially with the rack 28. The output of the motor 38 is converted into linear motion of the rack 28 by a ball-screw mechanism 40 so as to move the rack 28 in the direction that reduces or assists the steering force (steering torque) inputted through the steering wheel 14 by the vehicle operator.

A torque sensor 42 is provided in the vicinity of the rack-and-pinion steering gear 24 and outputs a signal indicating the direction and magnitude of the steering force (steering torque) τh inputted by the vehicle operator. A steering angle sensor 44 is provided in the vicinity of the steering shaft 16 and outputs a signal indicating the direction and magnitude of the steering angle (more precisely the angle of the steered front wheels 32) inputted by the vehicle operator. The steering angle sensor 44 is a rotary encoder or the like.

Wheel speed sensors 46, 46 situated in the vicinity of each of the front wheels 32, 32 and wheel speed sensors 50, 50 (FIG. 1; only one shown) situated in the vicinity of each of the two rear wheels 48, 48 (only one shown), output signals once every predetermined angle of rotation of the associated front and rear wheels. The wheel speed sensors 46, 46 and 50, 50 are magnetic pickups or the like. The front wheels 32, 32 are driven (steered) wheels powered by an engine (not shown) mounted at the front of the vehicle 10. The rear wheels 48, 48 are idle.

A vehicle height sensor 52 is provided in the vicinity of the suspension mechanism (not shown) of each front wheel 32 and a vehicle height sensor 54 is provided in the vicinity of the suspension mechanism (not shown) of each rear wheel 48. Based on the stroke (displacement) of the associated suspension mechanism, each height sensor outputs a signal indicating the height of the vehicle 10 at the sensor location.

As shown in FIG. 1, a single monocular CCD (Charge-Coupled Device) camera 64 (image sensor) combined with a rear-view mirror 62 is attached to the inner surface of the windshield 60 above the vehicle operator's seat 12. The CCD camera 64 is installed to take an image ahead of the vehicle 10, more particularly, to photo-sense and output an image signal of the road ahead of the vehicle 10. As shown in FIG. 2, the image signal outputted by the CCD camera 64 is forwarded to an image processing ECU (Electronic Control Unit) 66, comprised of a microcomputer, that extracts the lane boundaries (white lines) painted on the road from the image signal.

A laser radar (in a unit) 68 is provided at appropriate locations near the front bumper of the vehicle 10 and emits a laser beam forward in the direction in which the vehicle 10 advances, and scans to the left and right directions (vehicle-width direction). The outputs of the laser radar 68 are forwarded to a radar output processing ECU 70, also comprised of a microcomputer, where they are mixed with received waves obtained through an antenna (not shown) when the beam is reflected by a rigid object such as a reflector of another vehicle present ahead to calculate (detect) the distance to the rigid object based on the time lag from the beam transmission and the wave reception and the direction of the object based on the direction of beam transmission to which the reflection is received.

The vehicle steering control system according to the present invention has a first Electronic Control Unit (shown as "SAS ECU") 74, also comprised of a microcomputer. The outputs of the image processing ECU 66, the radar output processing ECU 70 and the torque sensor 42 etc., are inputted into the SAS ECU 74.

The system is also equipped with a second Electronic Control Unit (shown as "EPS ECU") 76 also comprised of a microcomputer. The outputs of the torque sensor 42 and the wheel speed sensor 46, etc., are inputted into the EPS ECU 76.

The SAS ECU 74 and the EPS ECU 76 are connected with a signal line 78 and can communicate with each other. The SAS ECU 74 calculates the lane-keeping-steering assist torque (output steering assist torque) TL such that the vehicle 10 runs along the lane, as explained later and forwards the same to the EPS ECU 76. The EPS ECU 76 calculates the power-steering assist torque such that the vehicle operator's steering is assisted if the steering τh is detected and corrects the received lane-keeping-steering assist torque TL by the calculated power-steering assist torque. Then, based on the output steering assist torque TL (corrected or not corrected), it calculates or determines a manipulated variable (motor current duty ratio) to be supplied to the electric motor 38.

The EPS ECU 76 is connected to a motor driver 80. The motor driver 80 is equipped with a known bridge circuit (not shown) composed of four power FET switching devices, the on/off state of which determines the direction in which the electric motor 38 will turn. The EPS ECU 76 calculates or determines the motor current in duty ratio in terms of PWM (pulse-width modulation) and outputs it to the motor driver 80. Thus, the EPS ECU 76 duty-ratio controls the FET switching devices to regulate the motor current such that the electric motor 38 generates the required assist torque.

A yaw rate sensor 82 is installed at a location near the center of gravity of the vehicle 10. The yaw rate sensor 82 outputs a signal indicating the yaw rate (angular velocity of yaw) around the vertical axis (the axis of gravity) at the center of gravity of the vehicle 10.

An alarm 84 is provided in the vicinity of the dashboard near the vehicle operator's seat 12 and alerts the vehicle operator audibly or visionally. Moreover, this system is equipped with a navigation system 88 (omitted in FIG. 1).

A brake switch 90 is associated with a brake pedal (not shown) near the floor at the vehicle operator's seat 12 and outputs a signal indicating the depression of the brake pedal by the vehicle operator. An accelerator position sensor 92 is associated with an accelerator pedal (not shown) and outputs a signal indicating the amount of depression of the accelerator pedal by the vehicle operator.

Figure 3:
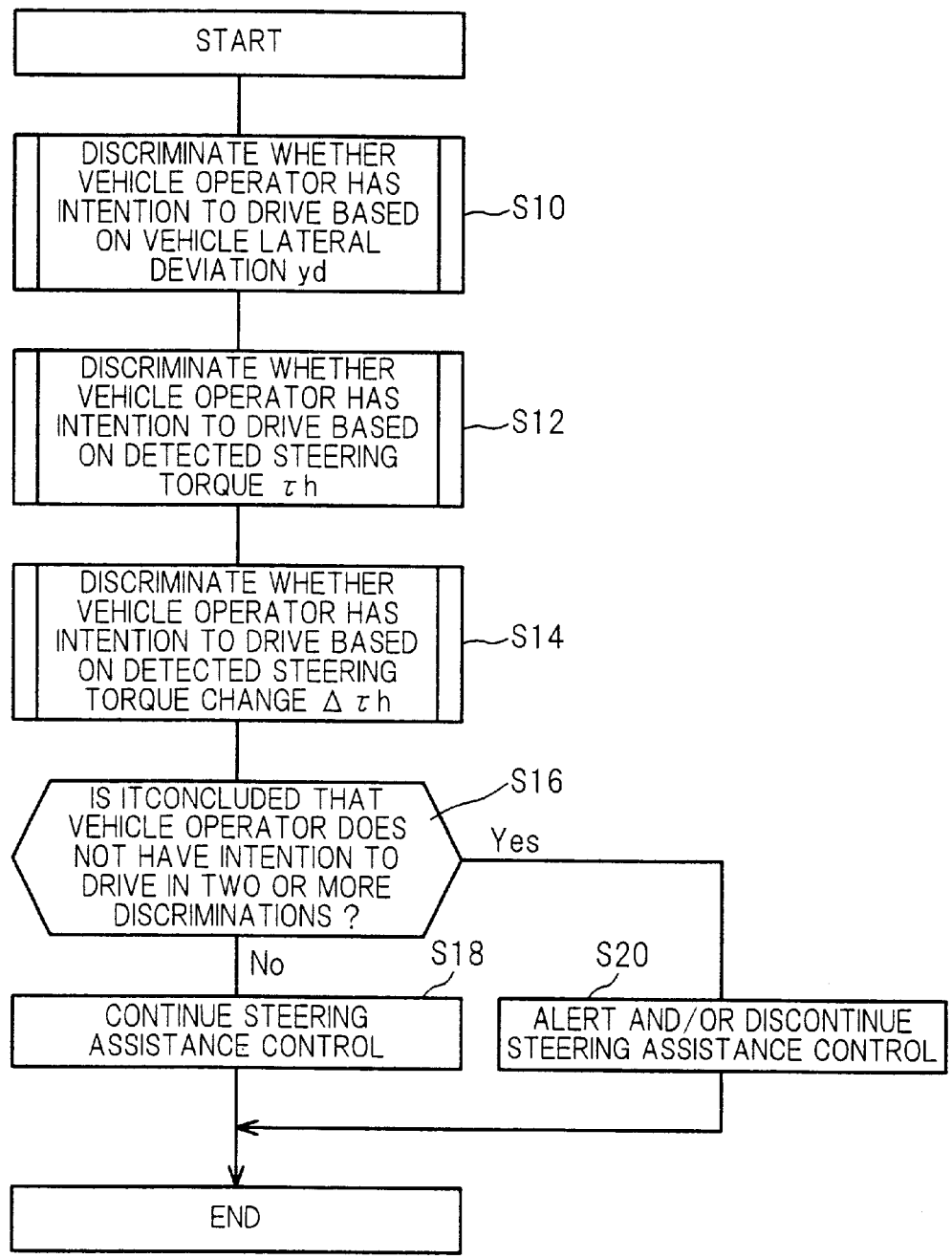
FIG. 3 is a flow chart showing the operation of the system illustrated in FIGS. 1 and 2.

FIG. 3 is a flow chart showing the operation of the vehicle steering control system according to the embodiment of the invention in which the intention of the vehicle operator to drive by himself during the aforesaid steering assistance control is determined.

Figure 4:
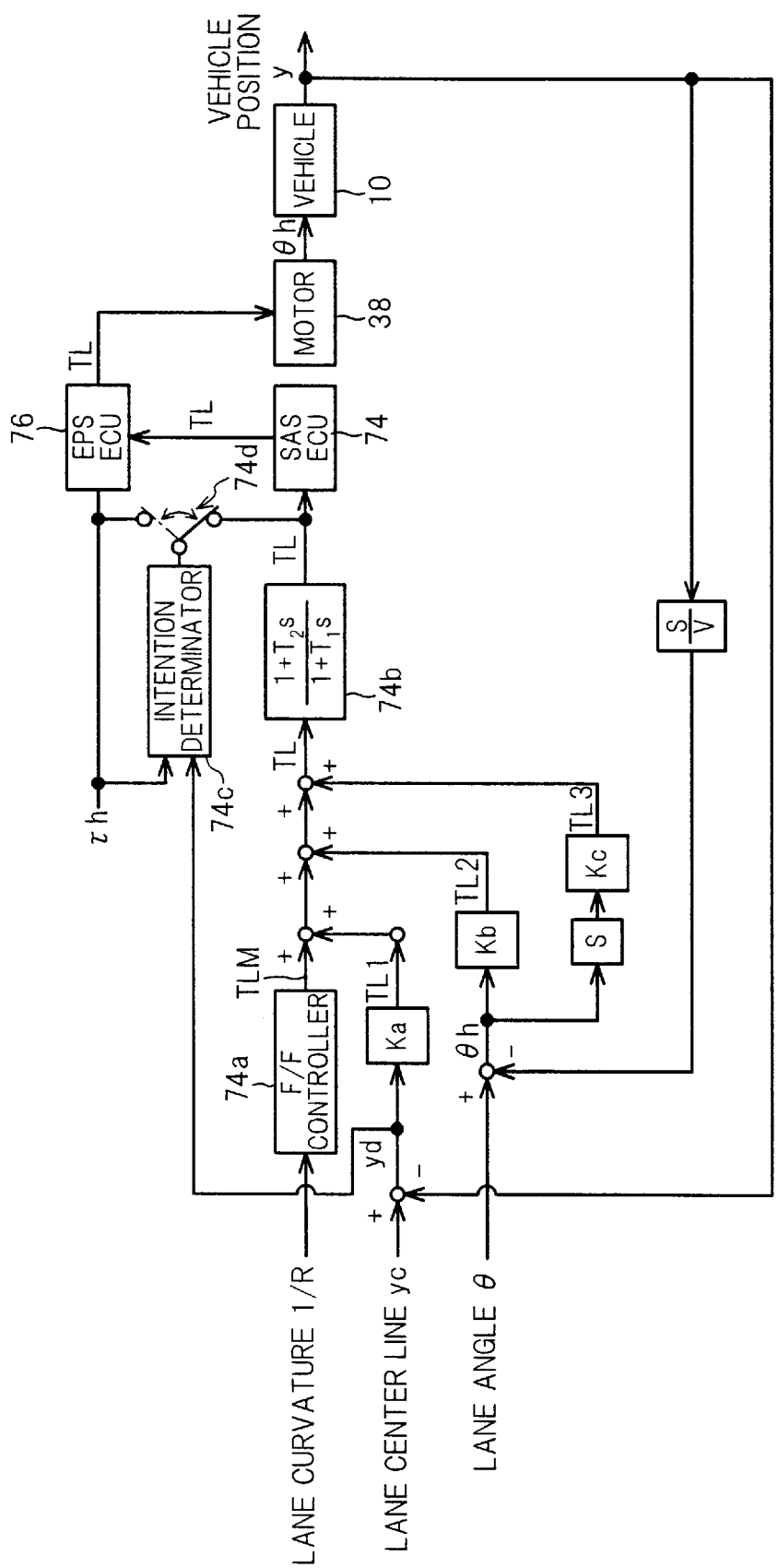
FIG. 4 is a block diagram showing the operation of the system illustrated in FIGS. 1 and 2.

Before entering the explanation of the flow chart, however, the aforesaid steering assistance control is outlined referring to a block diagram illustrated in FIG. 4.

FIG. 4 is a block diagram showing the operation of the vehicle steering control system according to the embodiment. The control illustrated there is conducted by the SAS ECU 74 and the EPS ECU 76, more precisely, mainly by the SAS ECU 74.

Specifically, the lane curvature 1/R is first determined or calculated based on the lane boundaries (white lines) obtained by image processing the output of the CCD camera 64 in the image processing ECU 66. Explaining this with reference to FIG. 5 which shows the image data obtained at the image processing ECU 66, the turning radius R of the center (reference) line yc of a lane is geometrically calculated and the curvature 1/R is determined by calculating the reciprocal number of the turning radius R.

At the same time, based on the image data obtained at the image processing ECU 66, the position y of the vehicle 10 on the lane is detected, and a lateral deviation yd and a heading angle θh of the vehicle 10 relative to the lane are calculated.

Figure 5:
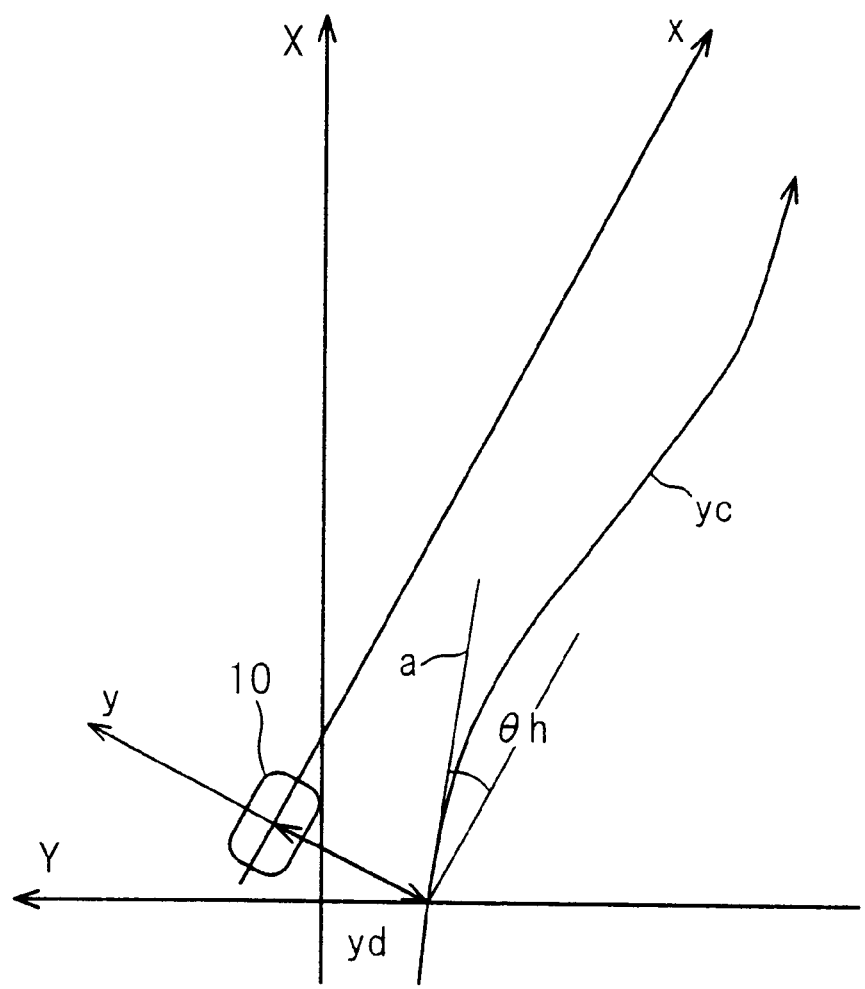
FIG. 5 is an explanatory graph showing the calculation of parameters to be used in the steering assistance control illustrated in FIG. 4.

More specifically, these parameters are calculated based on the memory of the image processing ECU 66 comprising lane information made of the image signals of the CCD camera 64 in the absolute coordinate system and the position information of the vehicle 10 overlapped thereon, as shown in FIG. 5. In FIG. 5, X-Y coordinates indicate the absolute coordinate system. And, x-y coordinates indicate a relative coordinate whose origin is set at the vehicle 10, whose x-axis is set to the direction in which the vehicle 10 advances and whose y-axis is set to the direction perpendicular thereto.

In the relative coordinate system, the vehicle lateral deviation yd indicates the distance between the point (at which the lane center line yc and the y-axis intersects) and the vehicle 10. The vehicle heading angle θh indicates the angle made by the tangent a at the point (closest to the vehicle 10) on the lane center line yc and the x-axis. The angle made by the tangent a relative to the Y-axis of the absolute coordinate system is called lane angle θ (which is shown in FIG. 4).

The block diagram of FIG. 4 shows that the vehicle lateral deviation yd is calculated as an error or deviation between the detected value (vehicle position y) and a desired value (the lane center line yc), and the vehicle heading angle θh is similarly calculated as an error or deviation between a detected value (obtained by dividing the differential (shown by a Laplacian S) of the vehicle position y by the detected vehicle speed V; i.e. a value corresponding to the angle) and a desired value (lane angle θ). In practice, however, the vehicle lateral deviation yd and the vehicle heading angle θh are calculated geometrically based on the image information in a manner similar to the calculation of the lane curvature 1/R, as will be understood from FIG. 5. Therefore, the calculation illustrated in FIG. 4 is for the purpose of understanding.

Returning to the explanation of FIG. 4, the calculated lane curvature 1/R is inputted into a F/F (feedforward) controller 74a (indicating one function of the SAS ECU 74), where a basic steering assist torque TLM is determined or calculated based on the inputted lane curvature 1/R in accordance with a predetermined characteristic. Parallel to this, first to third corrective steering assist torques TLn (n: 1 to 3) are calculated based on the calculated vehicle lateral deviation yd and the vehicle heading angle θh and are added to the basic steering assist torque TLM at adders.

Specifically, the first corrective steering assist torque TL1 is determined or calculated by multiplying the calculated vehicle lateral deviation yd by a first gain (feedback correction coefficient) Ka. The second corrective steering assist torque TL2 is determined or calculated by multiplying the vehicle heading angle θh by a second gain (feedback correction coefficient) Kb. And the third corrective steering assist torque TL3 is determined or calculated by multiplying the differential of the vehicle heading angle θh by a third gain (feedback correction coefficient) Kc.

In the above, the basic steering assist torque TLM indicates an assist torque which balances with the cornering force of the vehicle 10. The first and second corrective steering assist torques are assist torques which cause the vehicle 10 to run along the lane center line yc and ensure the stability of the vehicle 10. The third corrective steering assist torque is an assist torque which enhances the stability of the torque assistance control.

The corrective steering assist torques TLN are added to the basic steering assist torque TLM to determine or calculate the output steering assist torque TL and based on which, the steering of the vehicle 10 is assisted such that the vehicle 10 runs along the lane, more precisely, runs along the lane center line yc. The output steering assist torque TL is inputted into a phase compensator 74b (similarly indicating one function of the SAS ECU 74), where it is subject to the phase compensation (i.e. phase lead-lag compensation) and inputted, via SAS ECU 74, into the EPS ECU 76.

As mentioned above, the EPS ECU 76 calculates the power-steering assist torque if the steering torque τh is detected and corrects the output steering assist torque (lane-keeping-steering assist torque) TL by the calculated power-steering assist torque and based on the output steering assist torque TL (corrected or not corrected), calculates or determines a manipulated variable (motor current duty ratio) to be supplied to the electric motor 38 to turn the steered front wheels 32.

In this embodiment, there is provided an intention determinator 74c (similarly indicating one function of the SAS ECU 74) which determines whether the vehicle operator has the intention to drive the vehicle 10 by himself and conducts at least one of alerting the vehicle operator and discontinuing the steering assistance control (illustrated by a switch 74d which similarly indicates one of the functions of the SAS ECU 74) depending on a result of the determination.

Based on the above, the determination of the vehicle operator's driving intention which is the operation of the system according to the embodiment will be explained with reference to the flow chart of FIG. 3.

The program begins in S10 in which it is discriminated whether the vehicle operator has the intention to drive based on the vehicle lateral deviation yd.

Figure 6:
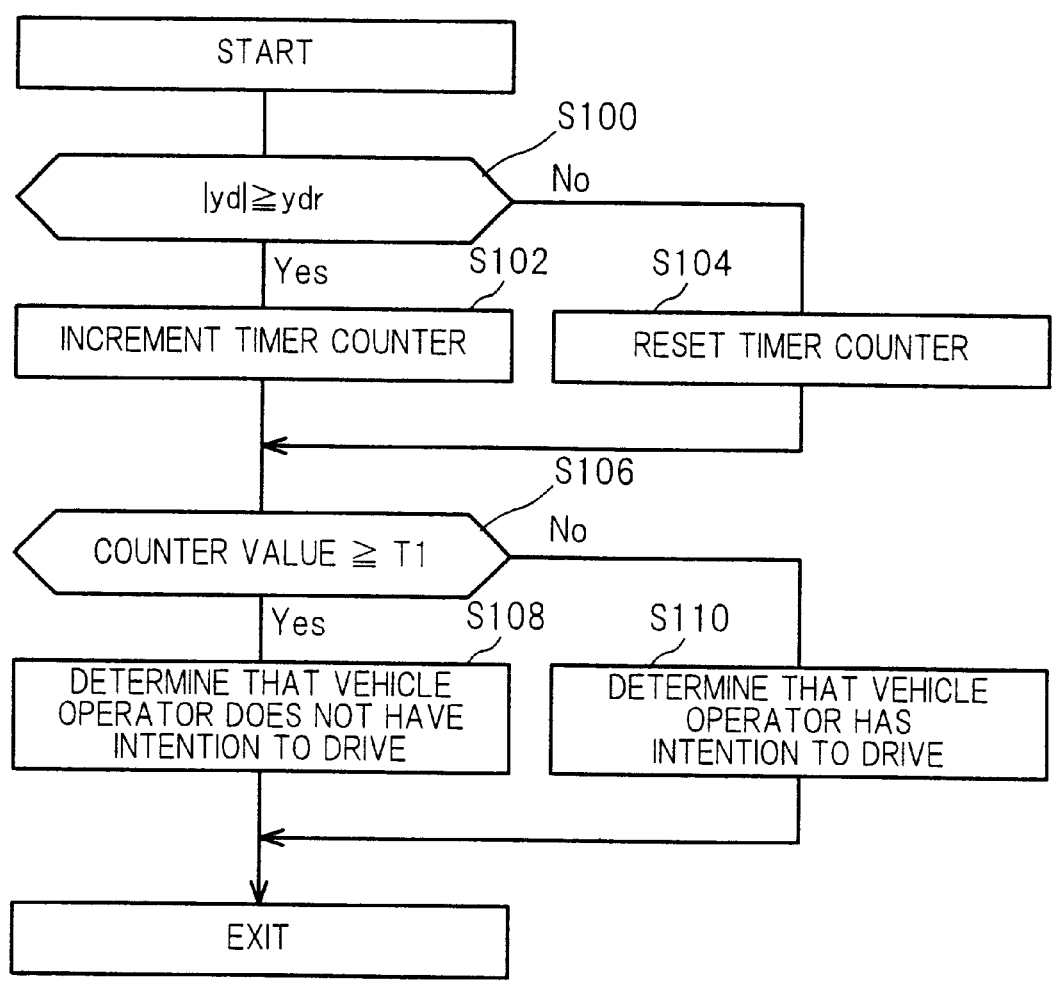
FIG. 6 is a flow chart showing the subroutine of a driving intention discrimination based on the detected lateral deviation referred to in the flow chart of FIG. 3.

FIG. 6 is a flow chart showing the subroutine of the driving intention discrimination.

The program begins in S100 in which it is determined whether the absolute value of the lateral deviation yd is greater or equal to a threshold value ydr and when the result is affirmative, the program proceeds to S102 in which a timer counter (up-counter) is incremented. When the result is negative, the program proceeds to S104 in which the value of the timer counter is reset to zero. The reason why the absolute value is used, since a deviation from the lane center line yc in the right is defined as a positive value and that in the left is defined as a negative value in the relative coordinate system illustrated in FIG. 5, both should similarly be treated.

The program then proceeds to S106 in which it is determined whether the value of the timer counter is greater or equal to a T1 sec. (e.g. 5 sec.) and when the result is affirmative, the program proceeds to S108 in which it is discriminated that the vehicle operator does not have the intention to drive. On the other hand, when the result is negative, the program proceeds to S110 in which it is discriminated that the vehicle operator has the intention to drive.

Figure 7:
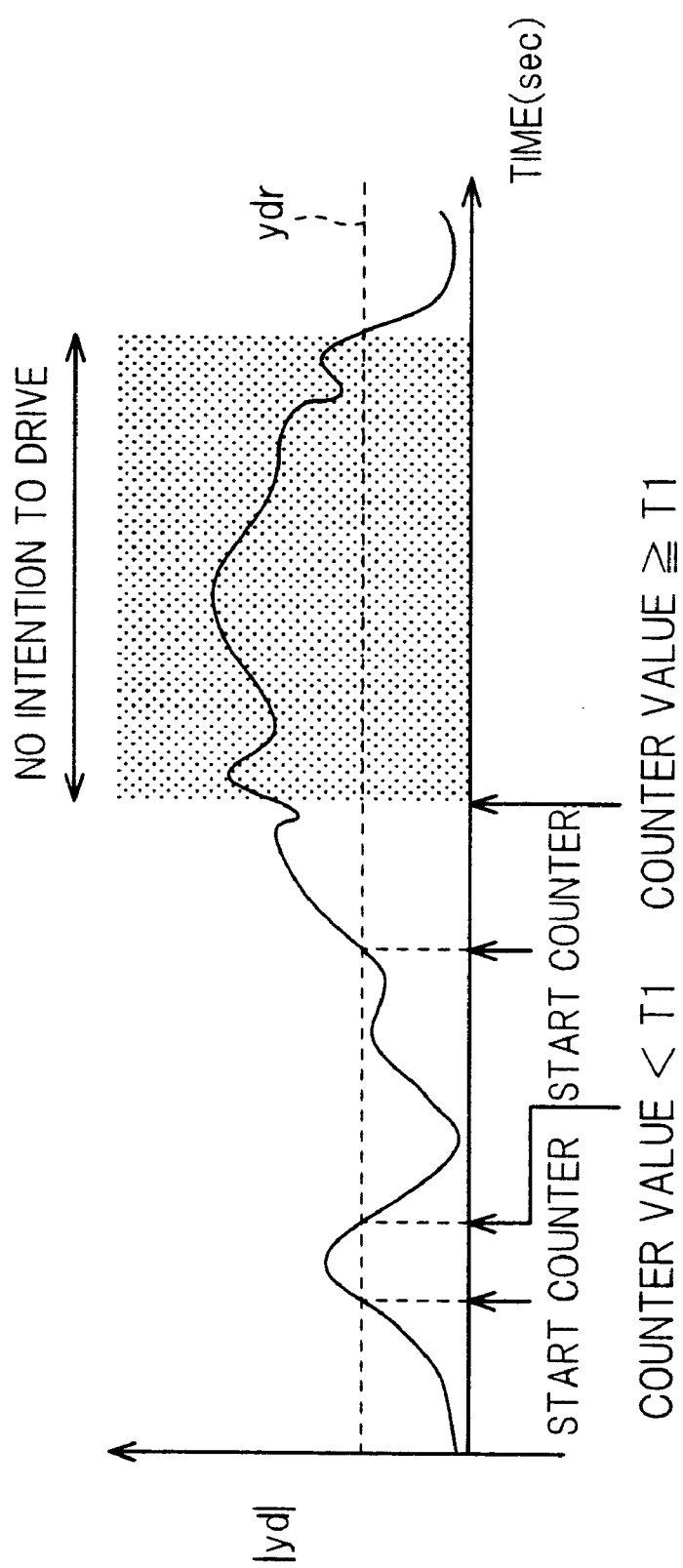
FIG. 7 is a time chart showing the operation of the flow chart of FIG. 6.

FIG. 7 is a time chart showing the operation illustrated in the flow chart of FIG. 6. If the vehicle operator does not have the intention to drive, more specifically, if the vehicle operator does not grip the steering wheel 16 or is asleep, the vehicle 10 tends to deviate from the lane center line yc towards the left or right direction (vehicle-width direction) due to a change of cants or undulations of the lane, even when the vehicle 10 is under the steering assistance control.

In view of the above, the lateral deviation yd from the lane center line yc is detected and when its absolute value (the deviation in the right or left) is found to be continuously greater or equal to the threshold value ydr for the period of time (T1 sec.), it is discriminated that the vehicle operator does not have the intention to drive the vehicle 10 by himself.

Thus, it becomes possible to improve the accuracy in determining the vehicle operator's intention to drive by using the lateral deviation yd. Moreover, by discriminating or determining that the vehicle operator has no intention to drive when the absolute value of lateral deviation yd is greater or equal to the threshold value ydr for the predetermined period of time, it becomes possible to surely determine whether or not the vehicle operator has the intention to drive, while preventing a temporal situation (which would cause no problem) from being determined that the vehicle operator loses the intention to drive.

Returning to the explanation of the flow chart of FIG. 3, the program proceeds to S12 in which it is discriminated whether the vehicle operator has the intention to drive based on the detected steering torque $\tau h$ inputted by the vehicle operator.

Figure 8:
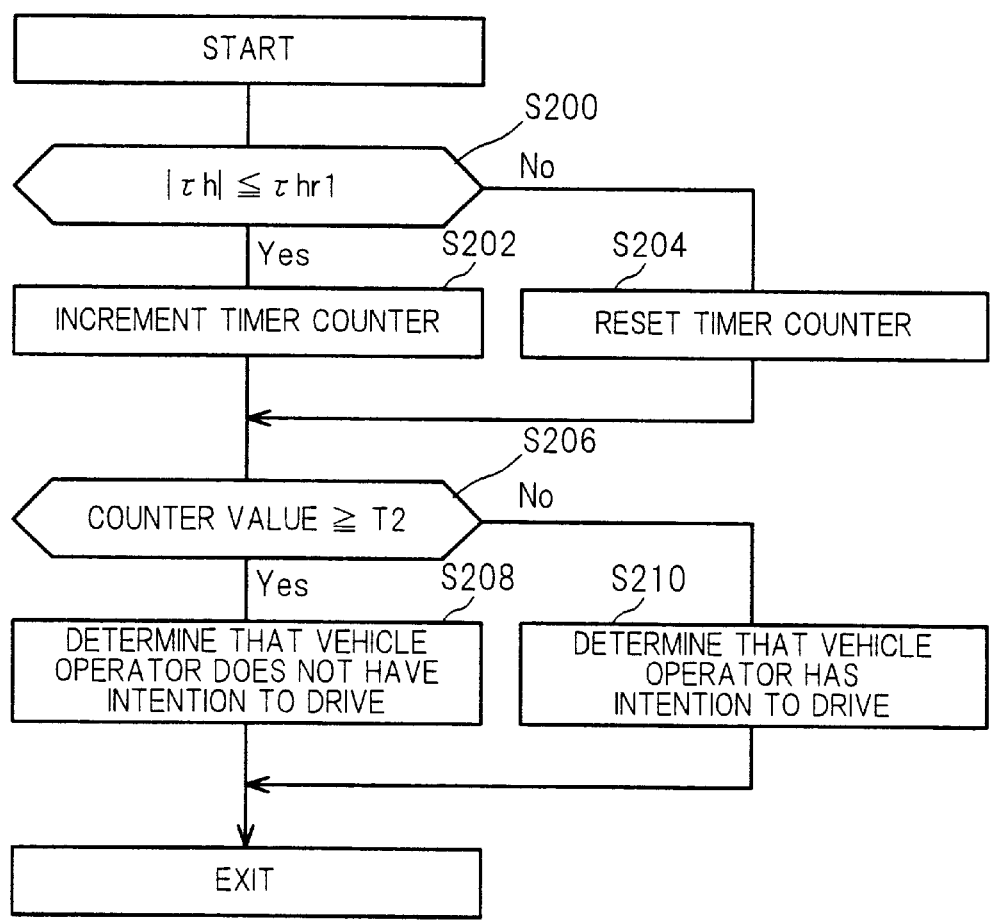
FIG. 8 is a flow chart showing the subroutine of the driving intention discrimination based on the detected steering torque referred to in the flow chart of FIG. 3.

FIG. 8 is a flow chart showing the subroutine of the driving intention discrimination.

The program begins in S200 in which it is determined whether the absolute value of the detected steering torque $\tau h$ is less than or equal to a threshold value $\tau hr1$ and when the result is affirmative, the program proceeds to S202 in which a timer counter (up-counter) is incremented. When the result is negative, the program proceeds to S204 in which the value of the timer counter is reset to zero. The reason to use the absolute value is to treat the inputted steering torque $\tau h$ similarly irrespective of the applied direction thereof is left or right.

The program then proceeds to S206 in which it is determined whether the value of the timer counter is greater or equal to a T2 sec. (e.g. 5 sec.) and when the result is affirmative, the program proceeds to S208 in which it is discriminated that the vehicle operator does not have the intention to drive. On the other hand, when the result is negative, the program proceeds to S210 in which it is discriminated that the vehicle operator has the intention to drive.

Figure 9:
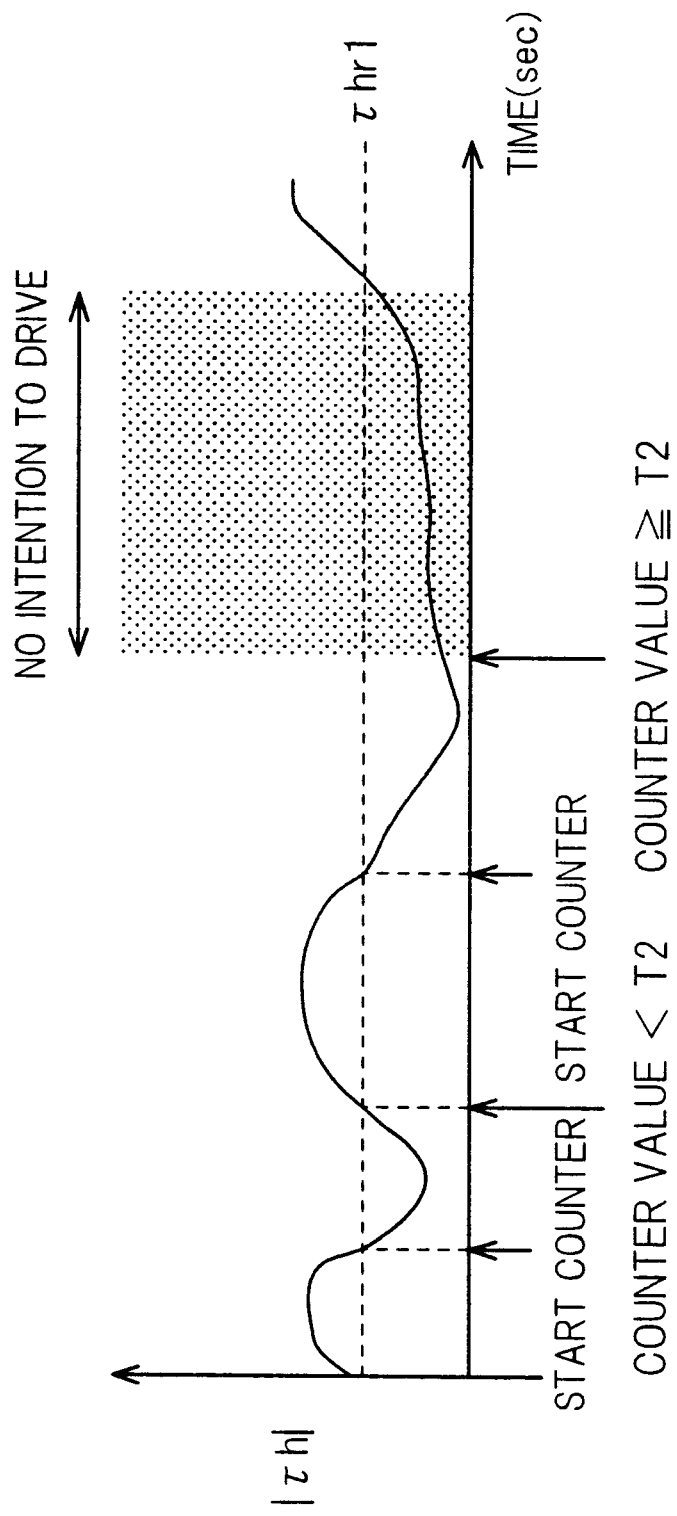
FIG. 9 is a time chart showing the operation of the flow chart of FIG. 8.

FIG. 9 is a time chart showing the operation illustrated in the flow chart of FIG. 8. If the vehicle operator's intention is decreased, since the detected (inputted) steering torque $\tau h$ is reduced, the detected (inputted) steering torque $\tau h$ tends to change in small values. In this embodiment, accordingly, the inputted steering torque $\tau h$ is detected and when its absolute value (the steering torque in the right or left) is continuously less than or equal to the threshold value $\tau hr1$ for the period of time (T2 sec.), it is discriminated that the vehicle operator does not have the intention to drive Thus, by discriminating or determining that the vehicle operator has no intention to drive when the absolute value of the inputted steering torque $\tau h$ is less than or equal to the threshold value $\tau hr1$ for the predetermined period of time, it becomes possible to accurately determine whether or not the vehicle operator has the intention to drive, while preventing a temporal situation (which would cause no problem) from being determined that the vehicle operator loses the intention to drive.

Returning to the explanation of the flow chart of FIG. 3, the program proceeds to S14 in which it is discriminated whether the vehicle operator has the intention to drive based on the change $\Delta \tau h$ of the detected steering torque $\tau h$ inputted by the vehicle operator.

Figure 10:
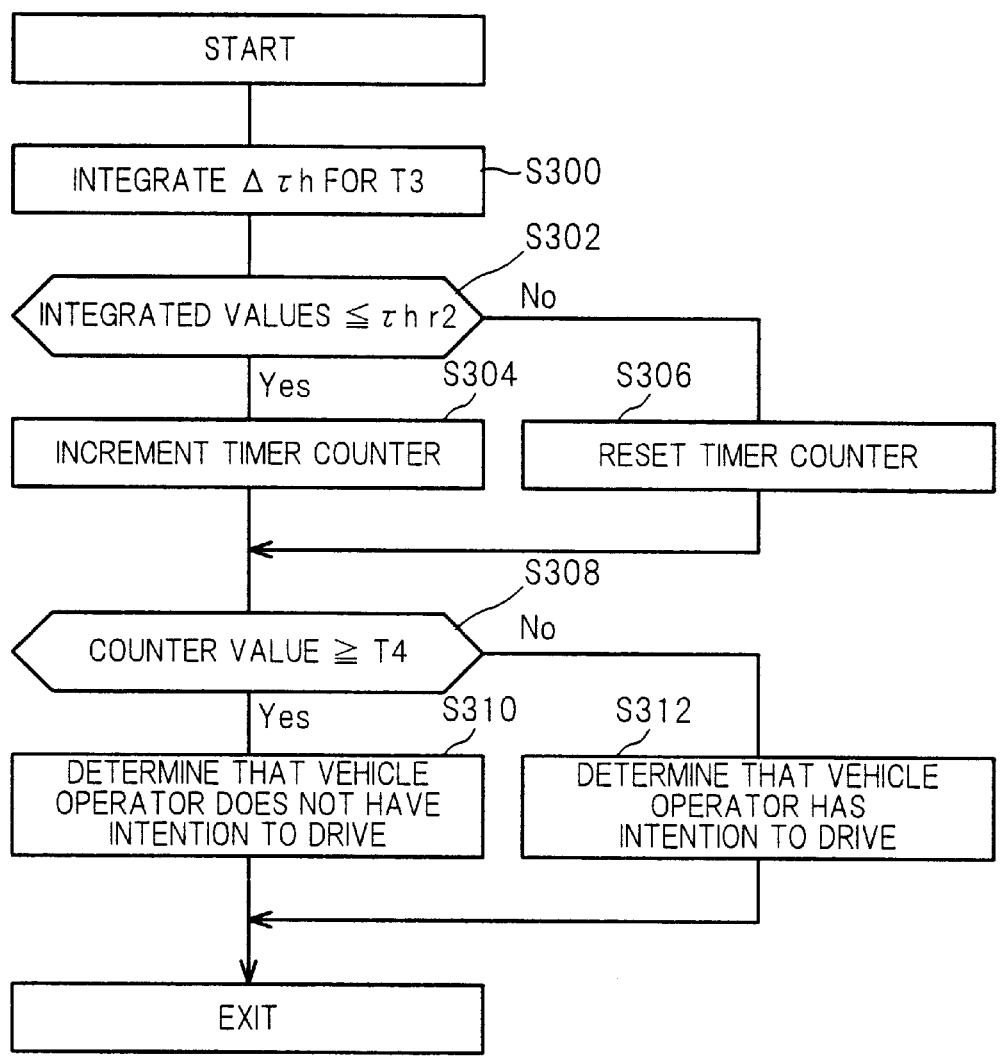
FIG. 10 is a flow chart showing the subroutine of the driving intention discrimination based on the detected steering torque change referred to in the flow chart of FIG. 3.

FIG. 10 is a flow chart showing the subroutine of the driving intention discrimination.

The program begins in S300 in which the change $\Delta \tau h$ of the detected steering torque $\tau h$ is integrated for a predetermined period of time T3 sec. (e.g. 2 sec.). The change $\Delta \tau h$ of the detected steering torque $\tau h$ indicates the absolute value of the difference between the steering torque $\tau h$ sampled (detected) at the current program loop and that at the preceding program loop of the flow chart of FIG. 3.

The program then proceeds to S302 in which it is determined whether the integrated value of the change $\Delta \tau h$ of the detected steering torque $\tau h$ is less than or equal to a threshold value $\tau hr2$ and when the result is affirmative, the program proceeds to S304 in which a timer counter (up-counter) is incremented. When the result is negative, the program proceeds to S306 in which the value of the timer counter is reset to zero.

The program then proceeds to S308 in which it is determined whether the value of the timer counter is greater or equal to a T4 sec. (e.g. 5 sec.) and when the result is affirmative, the program proceeds to S310 in which it is discriminated that the vehicle operator does not have the intention to drive. On the other hand, when the result is negative, the program proceeds to S312 in which it is discriminated that the vehicle operator has the intention to drive.

Figure 11:
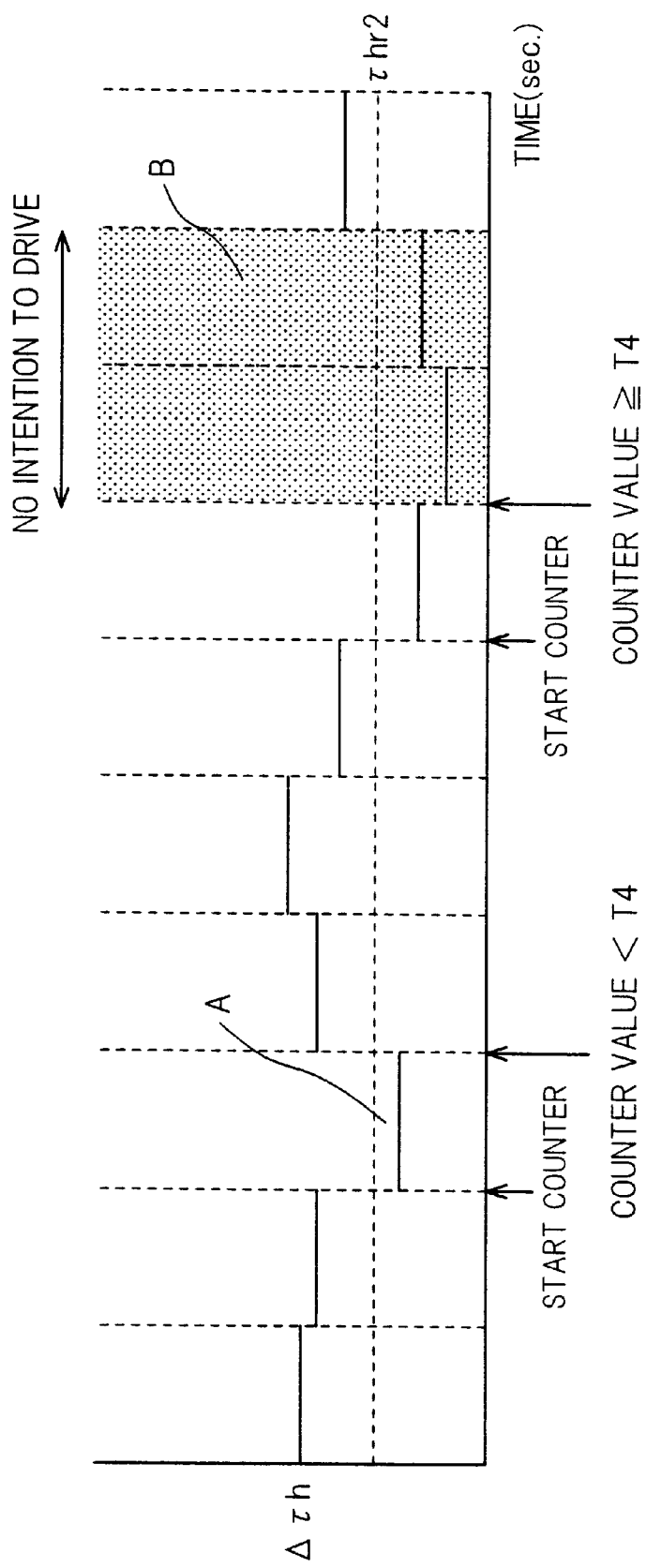
FIG. 11 is a time chart showing the operation of the flow chart of FIG. 10.

FIG. 11 is a time chart showing the operation illustrated in the flow chart of FIG. 10. If the vehicle operator's intention is decreased, the change $\Delta \tau h$ of the detected (inputted) steering torque $\tau h$ is similarly reduced. Therefore, the change is integrated and when the integrated value is continuously less than or equal to the threshold value $\tau hr2$ for the period of time (T4 sec.), it is discriminated that the vehicle operator does not have the intention to drive.

In the time chart shown in FIG. 11, the integrated value of the detected steering torque change $\Delta \tau h$ became less than the threshold value $\tau hr2$ at time point A. However, since it did not continue for the predetermined period of time (T4 sec.), it is discriminated that the vehicle operator still has the intention to drive. On the other hand, the integrated value of the detected steering torque change $\Delta \tau h$ became less than the threshold value $\tau hr2$ at time point B and it continued for the predetermined period of time (T4 sec.), it is discriminated that the vehicle operator does not have the intention to drive.

Thus, by discriminating or determining that the vehicle operator has no intention to drive when the integrated value of the detected steering torque change $\Delta \tau h$ is less than or equal to the threshold value $\tau hr2$ for the predetermined period of time, it also becomes possible to accurately determine whether or not the vehicle operator has the intention to drive, while preventing a temporal situation (which would cause no problem) from being determined that the vehicle operator loses the intention to drive.

Returning to the explanation of the flow chart of FIG. 3, the program proceeds to S16 in which it is checked whether it is concluded that the vehicle operator does not have the intention to drive in two or more discriminations. When the result is negative, the program proceeds to S18 in which the steering assistance control is continued.

On the other hand, when the result is affirmative, the program proceeds to S20 in which the vehicle operator is alerted by the alarm 84 and/or the steering assistance control is discontinued. This may be configured such that the vehicle operator is alerted to awake and to give advance notice of the discontinuation of the steering assistance control and then the control is discontinued. Alternatively, the control may immediately be discontinued without notice (alarm).

In this system, thus, the three kinds of parameters comprising the lateral deviation yd, the steering torque $\tau h$ and the steering torque change $\Delta \tau h$ are detected and it is discriminated whether the vehicle operator has the intention to drive by comparing these parameters respectively with the threshold values ydr, $\tau hr1$ and $\tau hr2$. With this, it becomes possible to accurately determine whether the vehicle operator has such an intention. In particular, the use of the lateral deviation yd is most effective in the determination.

Further, since the system is configured to determine whether it continues for the predetermined period of time (Tn sec.), the system can also prevent a temporal situation (which would cause no problem) from being determined that the vehicle operator loses the intention to drive.

Further, since the system is configured to determine that the vehicle operator does not have the intention to drive when the same conclusion is obtained in more than half of the discrimination, more precisely, in two or more discriminations, it can conduct the determination more accurately.

The embodiment is thus configured to have a system for controlling steering of a vehicle (10) having an actuator (electric motor 38) which turns steered wheels (32) of the vehicle (10); comprising: an image sensor (CCD camera 64) mounted on the vehicle (10) for taking an image ahead of the vehicle; lane detecting means (image processing ECU 66) for detecting a lane on which the vehicle travels based on outputs of the image sensor; and steering assist torque control means (SAS ECU 74, EPS ECU 76) for calculating a steering assist torque (TL) and conducting a steering assist control to operate the actuator (38) such that the vehicle (10) runs along the lane. The system includes: lateral deviation detecting means (CCD camera 64, image processing E CU 66, SAS ECU 74) for detecting a lateral deviation (yd) of the vehicle (10) from a reference line of the lane (yc); and intention determining means (SAS ECU 74, S10, S100–S110) for determining whether an operator of the vehicle has an intention to drive the vehicle (10) based on at least the detected lateral deviation (yd); and wherein the steering assist torque control means conducts at least one of alerting the operator and discontinuing the steering assist control, when it is determined by the intention determining means that the operator does not have the intention to drive the vehicle (SAS ECU 74, S16, S20).

The system further includes steering toque detecting means (torque sensor 42, SAS ECU 74) for detecting a steering torque (τh) inputted by the operator; and wherein the intention determining means determines whether the operator has the intention to drive the vehicle (10) based on at least the detected lateral deviation (yd) and the detected steering torque (τh; S10–S12, S100–S110, S200–S210).

The system further includes steering toque change detecting means (torque sensor 42, SAS ECU 74) for detecting a change of the steering torque (Δτh) inputted by the operator; and wherein the intention determining means determines whether the operator has the intention to drive the vehicle (10) based on at least the detected lateral deviation (yd), the detected steering torque (τh) and the detected change of the steering torque (Δτh; S10–S16, S100–S110, S200–S210, S300–S312).

In the system, the intention determining means conducts three kinds of discriminations as to whether the operator has the intention to drive the vehicle based on at least the detected lateral deviation (yd), the steering torque (τh) and the change of the detected steering torque (Δτh), and determines that the operator does not have the intention to drive the vehicle (10) when it is determined that the operator does not have the intention to drive the vehicle in more than half of the three kinds of discriminations (S10–S16).

In the system, the intention determining means includes: first comparing means (S100, S200, S300–S302) for comparing the detected value with a threshold value (ydr, τhr1, τhr2) to determine a condition that the detected value is greater or equal to the threshold value or the detected value is less than or equal to the threshold value; time measuring means (S102, S202, S304) for measuring a period of time during which the condition continues; second comparing means (S106, S206, S308) for comparing the measured period of time with a predetermined period of time (Tn); and wherein the intention determining means determines that the operator does not have the intention to drive the vehicle (10) when the measured period of time is greater or equal to the predetermined period of time (S108, S208, S310).

It should be noted in the above that, although no weight is assigned to the discriminations using the three parameters, it may alternatively be possible to assign weights to the discriminations.

It should also be noted in the above that, although the three kinds of discriminations are conducted and it is finally determined that the vehicle operator does not have the intention to drive when two or more discriminations reach the same conclusion, it is alternatively possible to finally determine that the vehicle operator does not have the intention if it is concluded in one of the discriminations that the vehicle operator does not have the intention to drive, or if all of the discriminations reach the same conclusion that the vehicle operator does not have the intention to drive.

It should further be noted in the above that, although the predetermined periods of time (Tn sec) are set to 5 sec. or 2 sec., it may alternatively be possible to set it to values other than those mentioned.

It should further be noted that, although the lateral deviation is calculated as the distance from the lane center line yc, it is alternatively possible to calculate it as a given point such as the lane boundary line (white line).

Although the invention has thus been shown and described with reference to specific embodiments, it should be noted that the invention is in no way limited to the details of the described arrangements but changes and modifications may be made without departing from the scope of the invention which is defined by the appended claims.

What is claimed is:

1. A system for controlling steering of a vehicle having an actuator which turns steered wheels of the vehicle; comprising:

an image sensor mounted on the vehicle for taking an image ahead of the vehicle;

lane detecting means for detecting a lane on which the vehicle travels based on outputs of the image sensor; and steering assist torque control means for calculating a steering assist torque and conducting a steering assist control to operate the actuator such that the vehicle runs along the lane;

wherein the improvement comprises:

the system includes:

lateral deviation detecting means for detecting a lateral deviation of the vehicle from a reference line of the lane; and intention determining means for determining whether an operator of the vehicle has an intention to drive the vehicle based on at least the detected lateral deviation;

and wherein the steering assist torque control means conducts at least one of alerting the operator and discontinuing the steering assist control, when it is determined by the intention determining means that the operator does not have the intention to drive the vehicle.

2. A system according to claim 1, wherein the intention determining means includes:

first comparing means for comparing the lateral deviation with a threshold value to determine a condition that the detected lateral deviation is greater or equal to the threshold value;

time measuring means for measuring a period of time during which the condition continues;

second comparing means for comparing the measured period of time with a predetermined period of time;

and wherein the intention determining means determines that the operator does not have the intention to drive the vehicle when the measured period of time is greater or equal to the predetermined period of time.

3. A system according to claim 1, further including;

steering toque detecting means for detecting a steering torque inputted by the operator;

and wherein the intention determining means determines whether the operator has the intention to drive the vehicle based on at least the detected lateral deviation and the detected steering torque.

4. A system according to claim 3, wherein the intention determining means includes:

first comparing means for comparing the detected steering torque with a threshold value to determine a condition that the detected steering torque is less than or equal to the threshold value;

time measuring means for measuring a period of time during which the condition continues;

second comparing means for comparing the measured period of time with a predetermined period of time;

and wherein the intention determining means determines that the operator does not have the intention to drive the vehicle when the measured period of time is greater or equal to the predetermined period of time.

5. A system according to claim 1, further including;

steering toque change detecting means for detecting a change of the steering torque inputted by the operator;

and wherein the intention determining means determines whether the operator has the intention to drive the vehicle based on at least the detected lateral deviation, the detected steering torque and the detected change of the steering torque.

6. A system according to claim 5, wherein the intention determining means includes:

first comparing means for comparing the detected change of the steering torque with a threshold value to determine a condition that the detected change of the steering torque is less than or equal to the threshold value;

time measuring means for measuring a period of time during which the condition continues;

second comparing means for comparing the measured period of time with a predetermined period of time;

and wherein the intention determining means determines that the operator does not have the intention to drive the vehicle when the measured period of time is greater or equal to the predetermined period of time.

7. A system according to claim 5, wherein the intention determining means conducts three kinds of discriminations as to whether the operator has the intention to drive the vehicle based on at least the detected lateral deviation, the steering torque and the change of the detected steering torque, and determines that the operator does not has the intention to drive the vehicle when it is determined that the operator does not have the intention to drive the vehicle in more than half of the three kinds of discriminations.

8. A system according to claim 1, wherein the reference line is a center line of the lane.

* * * * *